April 9, 1968
S. DEINES
3,376,606
APPARATUS FOR FORMING AND BENDING THERMOPLASTIC
TUBES, RODS, AND THE LIKE
Filed June 3, 1966
2 Sheets-Sheet 1
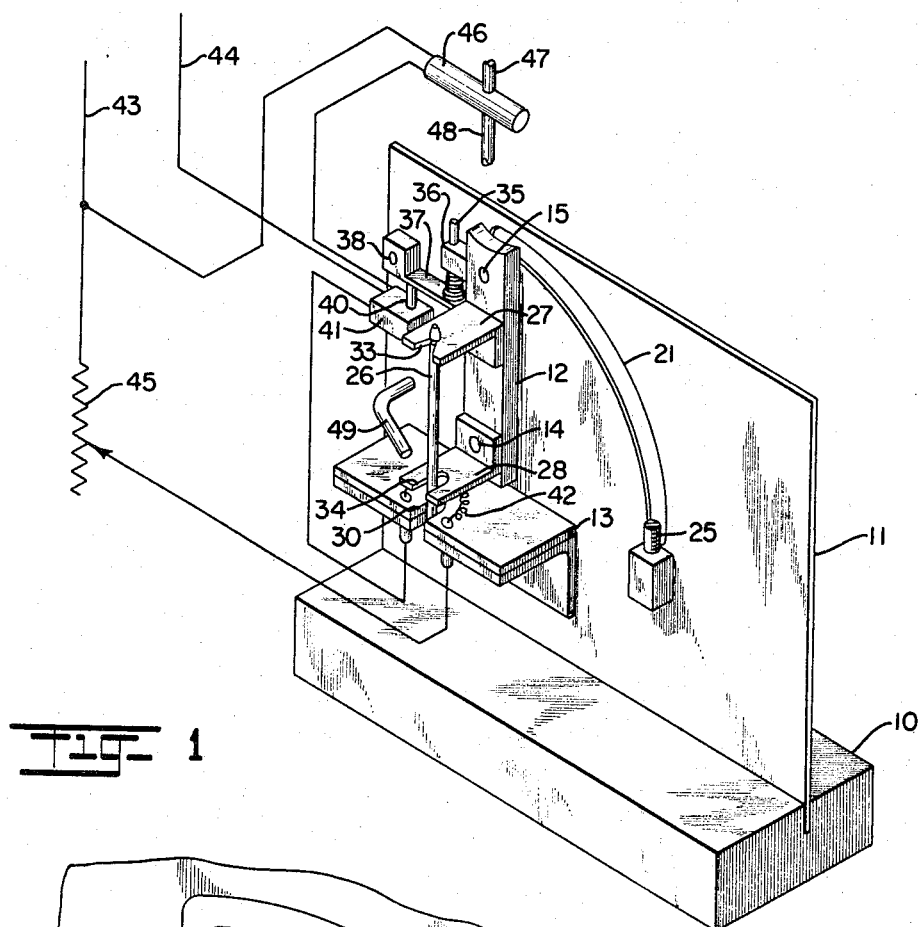
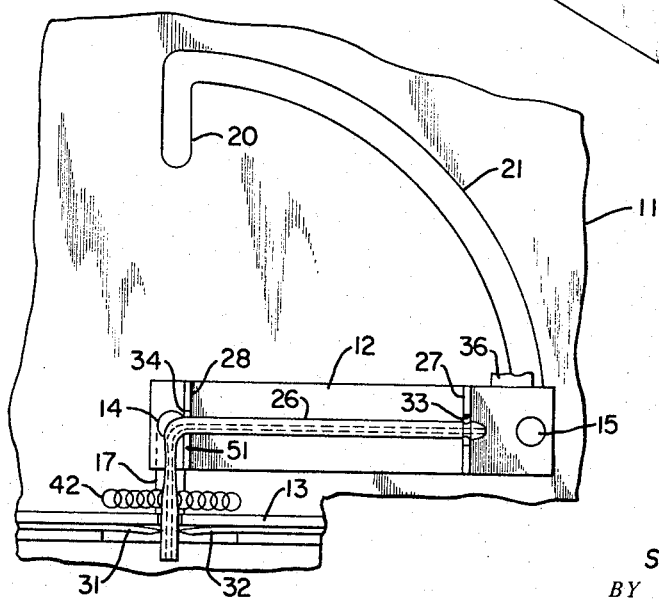
INVENTOR.
SIEGMUND DEINES
BY
ATTORNEYS April 9, 1968
S. DEINES
3,376,606
APPARATUS FOR FORMING AND BENDING THERMOPLASTIC
TUBES, RODS, AND THE LIKE
Filed June 3, 1966
2 Sheets-Sheet 2
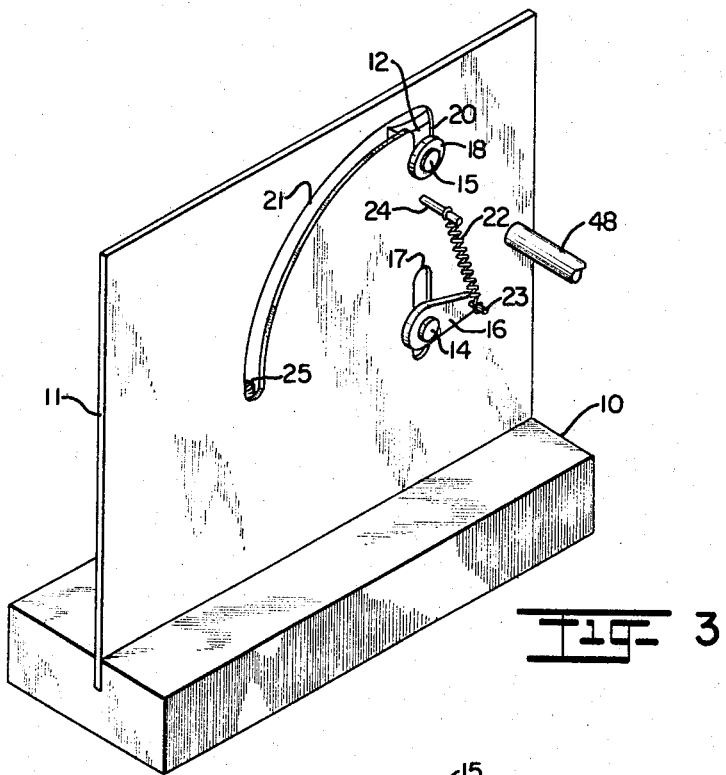
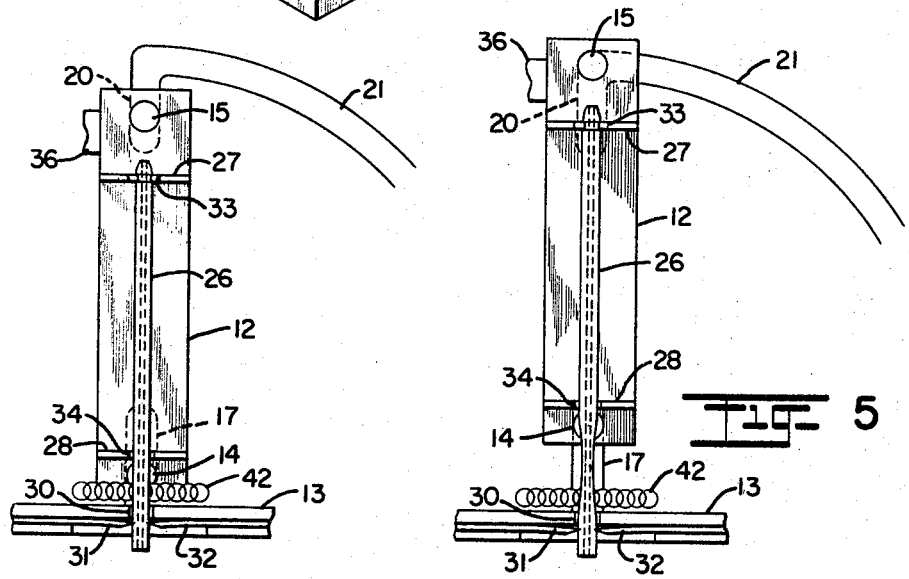
INVENTOR.
SIEGMUND DEINES
BY
*McGrew & Edwards*
ATTORNEYS

3,376,606
APPARATUS FOR FORMING AND BENDING THERMOPLASTIC TUBES, RODS, AND THE LIKE

Siegmund Deines, Fort Collins, Colo., assignor, by mesne assignments, to Aqua Tec Corporation, Denver, Colo., a corporation of California
Filed June 3, 1966, Ser. No. 555,059
11 Claims. (Cl. 18—19)

This invention relates to the forming and bending of tubes, rods and the like constructed of thermoplastic material and particularly to an improved apparatus for producing identical bent jet tubes in large quantities.

Many articles of commerce as presently manufactured require parts constructed of thermoplastic materials and these parts frequently require special forming apparatus to provide their required configuration. By way of example, an oral hygiene device now available requires a jet tube which is tapered at one end and bent at an angle to provide an offset jet. The internal diameter of the jet is required to lie within a relatively close range of tolerances in order that the device work at its optimum conditions of operation. Such tubes may be made by hand; however, it is difficult to maintain the internal diameter and shape of the jet as uniform as desired in quantity production. Accordingly it is an object of the present invention to provide an improved apparatus for producing formed thermoplastic tubes, ends and the like of uniform dimension and in rapid succession.

It is another object of this invention to provide an improved apparatus for producing jet tubes of uniform configuration from thermoplastic material.

Briefly, in carrying out the objects of this invention in one embodiment thereof an apparatus is provided which includes spaced tube engaging members and a spring for urging them apart so that when they are pressed together a tube held by them is under tension. A heater is positioned to heat a selected portion of the tube and one of the holders is biased to swing about a pivot near the heater when the tube engaging members are in their remote positions. The extension of the tube on heating causes it to elongate and neck down and it is then bent by movement about the pivot when the members have moved apart. The heat is discontinued upon elongation of the tube and the bent tube is cooled and removed.

The features of novelty which characterize this invention are pointed out with particularity in the claims annexed to and forming a part of this specification. The invention itself, however, both as to its organization and manner of operation, together with further objects and advantages thereof, may best be understood upon reference to the following description taken in connection with the accompanying drawings in which:

FIG. 1 is an isometric and partly diagrammatic view of a tube bending apparatus embodying the invention;

FIG. 2 is a front elevation view of a portion of the apparatus of FIG. 1, partly broken away and showing the tube after bending;

FIG. 3 is a rear view of the apparatus of FIG. 1 with the air supply and electric circuit elements omitted;

FIG. 4 is a front elevation view of the portion of the apparatus shown in FIG. 2 with a straight length of tube in place for forming; and FIG. 5 is a view of the same portion as FIG. 4 showing the tube elongated after heating and just prior to bending.

Referring now to the drawings, the thermoplastic tube bending apparatus illustrated in FIGS. 1, 2 and 3 comprises a rigid base 10 on which is securely mounted a panel 11 of aluminum alloy or other suitable heat resistant material, an arm or tube carrier 12 pivotally mounted on the panel, and a heating coil bracket 13 mounted on the panel below the lower pivoted end of the carrier 12.

The carrier 12 comprises an arm having pins 14 and 15 at the bottom and top, respectively, and which extend through the panel. The pin 14 is provided with an arm 16 rigidly secured thereto on the back side of the panel as shown in FIG. 3 and which acts as a retaining member and also allows the pin 14 to slide vertically in a slot 17 provided in the panel for this purpose. The pin 15 is provided with a washer or retainer 18 rigidly secured thereto on the back of the panel and which allows the pin to slide in a slot having a vertical portion 20 in alinement with the slot 17 and a circular arcuate portion 21 extending about a radius equal to the spacing between the centers of the pins 14 and 15 and centered at the upper position of the pin 14 in the slot 17.

The carrier 12 is biased upwardly by a tension spring 22 which engages a pin 23 on the outer end of the arm 16 and a pin 24 rigidly secured to the plate 11 on the center line of the slots 17 and 20. The spring 22 urges the carrier 12 upwardly in the slots 17 and 20 and then laterally along the arcuate slot 21 because of the lateral or rotational component of the force applied to the arm 16 about the pivot 14.

As shown in FIG. 2, the carrier 12 moves in a clockwise direction under the influence of the spring 22 and in the position shown in FIG. 2 is resting on an adjustable stop 25 shown in FIG. 1. In FIG. 1 the tube to be bent is shown at 26 as held in an upper bracket 27 on the carrier 12 and passing through a lower bracket 28 and through a slot 30 in the bracket 13 where it is held by a grip retainer comprising a pair of leaf springs 31 and 32 having sharp edges which grip the tube because of its upward bias when it is pressed downwardly past the springs and released. The tube 26 is held under tension between the bracket 27 in which it is shown held by a necked configuration at its upper end and which engages the end of a V-slot 33 provided for this purpose in the bracket 27.

The manner in which the tube 26 is placed in position on the apparatus is clearly shown in FIG. 4 which illustrates the straight tube in the position in which it is shown in FIG. 1, which is immediately after insertion in the apparatus, the tube being inserted in the slots 30 and 33 and a registering slot 34 in the bracket 28 and then being pressed downwardly past the leaf springs 31 and 32 so that it is retained against the force of the spring 22, the pins 14 and 15 lying in the slots 17 and 20, respectively.

When the tube has been inserted in the position shown in FIG. 4, a spring-loaded stop 35 slidably mounted in a lug or arm 36 at the upper end of the carriage 12 engages a lever 37 mounted on the plate 11 about a pivot 38 and moves the lever downwardly to engage an actuating plunger 40 of a single-pole-double-throw switch 41. This closes one pair of contacts of the switch and energizes an electric heating coil 42 which is positioned about the slot 30 and is connected in a circuit from electric supply lines 43 and 44 which includes an adjustable resistance 45. This energizes the heater 42 and softens the material of the tube 26.

Upon softening of the tube the bias pressure on the carriage 12 elongates the tube so that the carriage 12 rises until the pin 15 enters the arcuate slot 21 as shown in FIG. 5. During the upward movement of the carriage the switch 41 is released, the lever 37 and plunger 40 rising so that the heater 42 is disconnected, and upon closing of the opposite contacts of the switch a solenoid valve 46 is energized to open and supply air from a supply conduit 47 through a tube 48 to a nozzle 49 directed toward the heater 42. The rate of cooling effected by the discharge of air over the heater is such that the tube remains plastic long enough to allow movement of the carriage 12 to its position shown in FIG. 5 and to further allow bending of the tube to the position shown in FIG. 2 before it again solidifies. The arcuate or rotational movement is initiated by the force of the spring 22 and is supplemented by the weight of the carriage 12 which provides a gravity bias when the carriage has moved laterally of the center line of the slots 17 and 20.

The necking down of the tube produced by the elongation reduces the internal diameter of the elongated portion and provides a jet configuration, the tube being removed from the apparatus when hardened and then cut off in its necked portion to provide an angled jet of the desired length. The shape of the bend in the tubing 26 is determined by engagement of the lower side wall of the slot 34 indicated at 51 in FIG. 2, this side wall being engaged by the tube during its bending to the configuration shown.

The degree of heat may be adjusted by means of the resistance 45, the amount of cooling air may be adjusted, the stop 25 may be adjusted, and the stop 35 may be adjusted; it is thus apparent that the apparatus may be employed to allow for various differences in material and the shapes of the product to be produced. Furthermore, the position of the bending edge 51 of the slot 34 may be selected for the article to be produced and also the arrangement for holding the upper end of the tube or other article in the bracket 27, the arrangement employing the notched configuration of the end of the tube being illustrated merely by way of example.

The simplified arrangement for inserting the articles from the front of the apparatus while affording heating substantially around the lower end of the tubing assures rapid installation, and forming of the tubing and removal of the final product. By way of illustration only and not by way of limitation, one apparatus built as illustrated and described herein was provided for bending tubing having an external diameter of 3/16 inch and an internal diameter of 1/16 inch, the straight tubing inserted in the apparatus being slightly over four inches in length and having a tapered and notched upper end as illustrated. The final configuration of the jet formed on the device was approximately 3 5/8 inches in length with the jet extending laterally about 1/4 inch after cutting of the elongated portion.

It has been found that this apparatus provides products of substantially identical configuration and may be operated repeatedly, allowing sufficient time for cooling of the tube before removal. It was observed that, after opening of the limit switch controlling the heater and opening of the air valve, the remainder of the cycle occurred rapidly in a period of the order of one to two seconds, sufficient heat remaining in the heating element to counteract the initial effects of the cooling air so that the elongated portion remained sufficiently plastic to allow bending. The cooling interval after bending was preferably of the order of five to ten seconds in order to insure no distortion of the bent tubing.

In order that an operator may produce substantial numbers of the tubing without waiting for each tube to cool, the devices of this invention may be employed in multiple, one person operating from four to six of the devices, loading each one as its product has cooled sufficiently.

The operation of this apparatus wherein the elongation of the thermoplastic tubing under heat is employed to initiate and control the bending operation results in uniformity of the product and the production of large quantities of the product without significant variation in configuration or dimension.

It is recognized that during the forming of various articles from thermoplastic materials sudden changes in ambient temperatures or sudden drafts or air turbulence conditions should be avoided because they tend to cause differences in the configuration of the formed articles; and in addition the individual characteristics of each material should be known in order that the various functions of the apparatus of this invention may be performed under optimum conditions. Thus it may be found desirable or even necessary in some applications to provide shields to prevent turbulence of the air about the article being formed.

While the invention has been illustrated in connection with a specific form and arrangement of one embodiment thereof, various other applications and embodiments will occur to those skilled in the art. Therefore, it is not desired that the invention be limited to the details illustrated and described and it is intended by the appended claims to cover all modifications which fall within the spirit and scope of the invention.

I claim:

1. An apparatus for forming articles from thermoplastic tubing and the like comprising
   a support,
   means mounted on said support for engaging a length of tubing at spaced positions therealong and for maintaining under tension that part of the tubing between said positions,
   means for heating a predetermined portion of the tubing between said positions to soften the material thereof and allow elongation of the tubing under tension,
   means on said support for limiting the elongation of the tubing to a predetermined amount,
   and control means dependent upon the elongation of the tubing for limiting the effective operation of said heating means to afford cooling and solidification of the elongated portion of the tubing.

2. An apparatus for forming articles from thermoplastic tubing as set forth in claim 1 wherein said means for engaging the tubing comprises two holding elements relatively movable toward and away from one another along a straight line and means for biasing said holding elements apart and including a control means actuated upon movement of said elements toward one another for energizing said heating means, said control means being actuated upon separation of said members by the elongation of the tubing to de-energize said heating means.

3. An apparatus for forming articles from thermoplastic tubing as set forth in claim 2 including means for producing a flow of cooling fluid over said heating means and the elongated section of a tubing in said apparatus and means dependent upon movement of said members away from one another by a predetermined amount for actuating said cooling means.

4. An apparatus for forming articles from thermoplastic tubing as set forth in claim 1 wherein said means for engaging the tubing comprises two holding elements relatively movable toward and away from one another along a straight line and means for biasing said elements apart to introduce said tension in the tubing, one of said elements cooperating with the tubing to hold it in a fixed position against movement in either direction longitudinally of the tubing and the other of said elements comprising a one-way clutch affording movement of the tubing therethrough when said elements are moved toward one another and preventing reverse movement of the tubing.

5. An apparatus for forming articles from thermoplastic material as set forth in claim 4 wherein both said holding elements and said heating means afford open access from one side whereby a tubing held therein is free to be removed bodily laterally upon completion of the forming of the article.

6. An apparatus for forming articles from thermoplastic material as set forth in claim 2 wherein said heating means comprises an electric heater mounted on said support about said tubing and a normally open electric switch in the circuit of said heater, means for directing cooling fluid into the zone adjacent said heater, a normally closed solenoid valve for controlling the flow of cooling fluid, a normally closed switch for energizing said solenoid valve to supply fluid, and an actuator associated with said holding elements for closing said first switch and opening said second switch when said holding elements are moved toward one another.

7. An apparatus for forming articles from thermoplastic tubing as set forth in claim 1 including means dependent upon the attainment of said predetermined amount of elongation of the tubing for moving one end of the tubing laterally to produce a bend of said elongated portion, and means for limiting the degree of bending of the tubing.

8. An apparatus for forming articles from thermoplastic tubing as set forth in claim 7 including a stop mounted on said support for engagement with the tubing adjacent the heated portion thereof for determining the position of the bend in the tubing.

9. An apparatus for forming articles from thermoplastic tubing as set forth in claim 8 wherein said means for engaging the tubing at spaced positions comprises a first holding member secured in fixed relationship to said support and a carriage slidably mounted on said support and movable toward and away from said first holding member and having a second holding member mounted thereon and wherein said stop is positioned on said carriage remote from said second holding member, said carriage being pivotally mounted on said support adjacent said stop and upon movement against said elongation limiting means being rotatable on said pivot to bend the tubing.

10. An apparatus for forming jet nozzles and the like from thermoplastic tubing comprising a support, an arm pivotally mounted on said support, a pair of aligned guides on said support for restraining said arm for limited longitudinal movement, the pivotal mounting of said arm being movable in one of said guides and said arm having a follower remote from said pivotal mounting in engagement with the other of said guides, said other of said guides having an arcuate lateral extension from its end remote from said one guide and affording swinging movement of said arm about said pivotal mounting, a first tube holding element on said arm remote from its pivot, a second tube holding element fixed on said support in alinement with said guides and spaced from the end of said one guide remote from said other guide, spring means for urging said arm away from said fixed element and laterally toward said arcuate guide extension whereby a length of tubing may be held in tension between said elements, means adjacent said pivotal mounting for heating a portion of a tubing mounted on said elements whereby the tubing is softened and elongated and upon sufficient elongation is bent by swinging of said arm on said arcuate guide, and means dependent on elongation of the tubing for de-energizing said heating means to afford cooling of the bent tubing.

11. An apparatus for forming jet nozzles and the like from thermoplastic tubing comprising an upright supporting plate having upper and lower spaced vertically alined slots therein and an arcuate slot extending from the upper end of the upper slot about a center in the lower slot, an elongated arm having a pivot pin slidably mounted in the lower slot and a guide pin entering the upper slot and movable therethrough and into said arcuate slot, means including a tension spring connected between said plate and said pivot pin for urging said arm upwardly in said alined slots and laterally into said arcuate slot, the weight of said arm supplementing the tension of said spring to rotate the arm, means for attaching one end of a length of thermoplastic tube to said arm remote from said pivot, means for attaching the lower end of the tube in fixed relationship to said plate below said lower slot whereby the tube may be secured in said attaching means and to hold said arm downwardly against the tension of said spring, an electric heater mounted on said support near said pivot and in general alinement with said attaching means for heating the adjacent portion of a tube held therein, a normally open switch for controlling said heater, and means actuated by downward movement of said arm along said slots for closing said switch whereby when a tube mounted in said attaching means is elongated by heating, it releases said arm for upward movement and opens said switch to de-energize said heater.

References Cited

UNITED STATES PATENTS

| | | | |
|---|---|---|---|
| 2,304,467 | 12/1942 | Maltby. | |
| 2,393,979 | 2/1946 | Everett. | |
| 2,439,902 | 4/1948 | Noel | 65—281 |
| 2,476,658 | 7/1949 | Gyeiner | 18—19 |
| 2,571,416 | 10/1951 | Brown | 65—281 |
| 3,113,010 | 12/1963 | Willis et al. | 65—108 XR |
| 3,127,921 | 4/1964 | Kusisto | 18—19 |

FOREIGN PATENTS 625,823  8/1961  Canada.

WILLIAM J. STEPHENSON, *Primary Examiner.*